United States Patent
Viswanathan et al.

(10) Patent No.: US 9,870,269 B1
(45) Date of Patent: Jan. 16, 2018

(54) JOB ALLOCATION IN A CLUSTERED ENVIRONMENT

(71) Applicant: AMAZON TECHNOLOGIES, INC., Reno, NV (US)

(72) Inventors: Suresh Viswanathan, Sammamish, WA (US); Yasser Galal Hussein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1104 days.

(21) Appl. No.: 14/019,255

(22) Filed: Sep. 5, 2013

(51) Int. Cl.
*G06F 9/46* (2006.01)
*G06F 9/50* (2006.01)
*G06F 9/48* (2006.01)

(52) U.S. Cl.
CPC .......... *G06F 9/5055* (2013.01); *G06F 9/4881* (2013.01); *G06F 9/50* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 2007/0094662 A1* | 4/2007 | Berstis | G06F 9/505 718/102 |
| 2008/0184254 A1* | 7/2008 | Bernard | G06F 9/505 718/105 |
| 2010/0274621 A1* | 10/2010 | Diwakar | G06Q 50/188 705/80 |
| 2014/0245298 A1* | 8/2014 | Zhou | G06F 9/455 718/1 |

* cited by examiner

*Primary Examiner* — Lewis A Bullock, Jr.
*Assistant Examiner* — Mark Gooray
(74) *Attorney, Agent, or Firm* — Lindauer Law, PLLC

(57) ABSTRACT

Described herein are systems, devices, and methods for using a job scheduler that allocates jobs to cluster nodes in a data warehouse. The cluster nodes in the data warehouse may generate information about the availability to execute new jobs. The job scheduler may use the information about the availability to determine which cluster node to allocate a particular job based on current information or a prediction of availability. As a result the data warehouse becomes more stable.

20 Claims, 10 Drawing Sheets

| Availability Table 502(1) | Availability Data 118(1) | | |
|---|---|---|---|
| Cluster node identification value 504(1) | Status 506(1) | Reason for unavailability 508(1) | Date 510(1) |
| 1 | Available | N/A | 01JUL2013 |
| | Unavailable | Processor usage value exceeds threshold value | 20JUN2013 |
| | Unavailable | Number of jobs value exceeds threshold value | 15JUN2013 |
| | Unavailable | Memory usage value exceeds threshold value | 10JUN2013 |
| | Available | N/A | 05JUN2013 |
| | Available | N/A | 01JUN2013 |

| Availability Table 502(2) | Availability Data 118(2) | | |
|---|---|---|---|
| Cluster node identification value 504(2) | Status 506(2) | Reason for unavailability 508(2) | Date 510(2) |
| 2 | Available | N/A | 02JUL2013 |
| | Unavailable | Memory usage value exceeds threshold value | 21JUN2013 |
| | Unavailable | Memory usage value exceeds threshold value | 16JUN2013 |
| | Unavailable | Memory usage value exceeds threshold value | 11JUN2013 |
| | Available | N/A | 06JUN2013 |
| | Unavailable | Memory usage value exceeds threshold value | 02JUN2013 |

FIG. 5

| THRESHOLD TABLE 602 | THRESHOLD DATASTORE 112 | | | |
|---|---|---|---|---|
| | CLUSTER NODE 110(1) | CLUSTER NODE 110(2) | CLUSTER NODE 110(3) | ... |
| METRICS 402 | THRESHOLD VALUE 406(1) | THRESHOLD VALUE 406(2) | THRESHOLD VALUE 406(3) | |
| PROCESSOR USAGE 402(1) | 150 | 200 | 200 | |
| MEMORY USAGE 402(2) | 10 | 20 | 20 | |
| DISK USAGE 402(3) | 40 | 40 | 40 | |
| LATENCY 402(4) | 100 | 100 | 100 | |
| BYTES SENT ON NETWORK 402(5) | 100 | 100 | 100 | |
| NUMBER OF TCP CONNECTIONS 402(6) | 5 | 10 | 10 | |
| NUMBER OF CACHE LOOKUPS 402(7) | 10 | 10 | 10 | |
| NUMBER OF JOBS 402(8) | 8 | 8 | 8 | |
| TRANSACTIONS PER SECOND 402(9) | 800 | 1000 | 1000 | |
| BANDWIDTH 402(10) | 100 | 200 | 100 | |

FIG. 6

JOB ALLOCATION IN A CLUSTERED ENVIRONMENT

BACKGROUND

Large internet-based enterprises such as e-commerce companies may collect and store large amounts of data including customer information, product information, sales records, shipping data, and so forth. Typically, such an enterprise will operate a data warehouse that includes a large number of databases or clusters of databases. However, as an e-commerce business expands and its business needs grow, traditional data warehousing methods may be insufficient to handle increased query loads and increased requirements for storage capacity.

BRIEF DESCRIPTION OF THE DRAWINGS

FIG. 5 illustrates examples of availability data which includes data about availability status and reasons for unavailability.

FIG. 6 illustrates an example threshold datastore which includes different threshold values associated with different cluster nodes.

Figure 1:
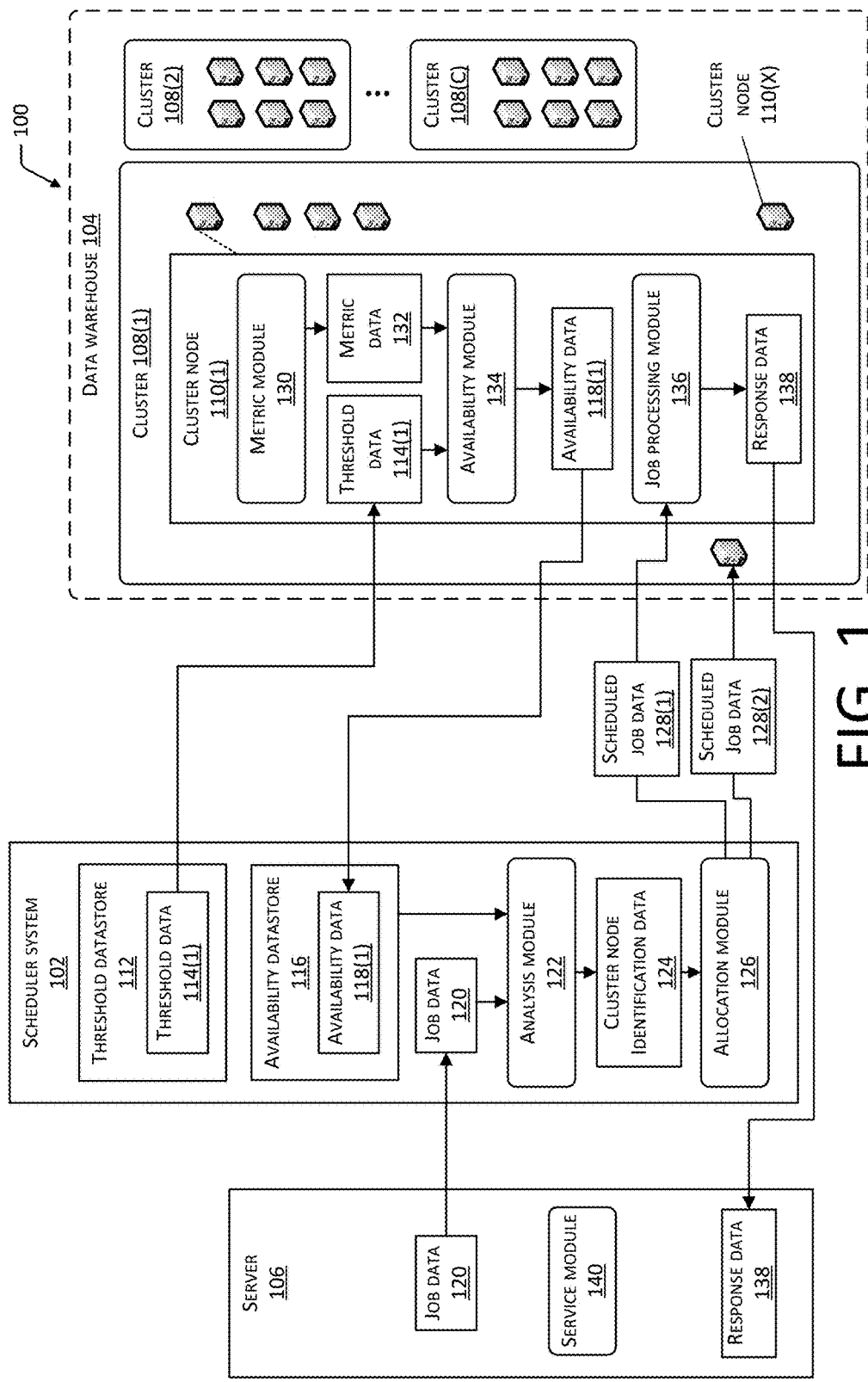
FIG. 1 is a block diagram of a system configured to provide scheduled job data to different cluster nodes using availability data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A data warehouse may include cluster nodes that are configured to execute one or more jobs. A cluster node may comprise a computing device, such as a server. The job may comprise a computational task, such as executing a query against a large amount of data. Execution of the jobs consumes resources on the cluster node, such as memory, processor time, input/output, and so forth. If too many resources on the cluster node are consumed, the cluster node may become unstable and unable to execute jobs. As information processing systems continue to grow in size and complexity, allocating jobs to the cluster nodes in the data warehouse that will efficiently execute the jobs has become challenging.

This disclosure relates to systems and methods for allocating jobs to cluster nodes in a data warehouse using a scheduler system. The scheduler system may comprise one or more servers or other information processing systems. The scheduler system may allocate one or more jobs to one or more cluster nodes which are configured to execute the jobs. In one example, the scheduler system allocates a first job to a first computing device in a cluster of cluster nodes, and allocates a second job to a second computing device in the cluster of cluster nodes. The jobs may be received from various computing devices such as servers.

The scheduler system may allocate the job to a particular cluster node using availability data. In some implementations, the availability data comprises data about the capacity of the cluster node to execute the job. The availability data may indicate that the cluster node is available to execute the job. The cluster node may be available to execute the job when a sufficient amount of resources are available on the cluster node. The cluster node may be unavailable to execute the job for various reasons. For example, the cluster node may not have a sufficient amount of resources to execute the job, or the cluster node may be executing a critical job which requires that the cluster node only executes the critical job for a designated period of time. If the cluster node is unavailable to execute the job, the scheduler system may allocate the job to another cluster node that is available to execute the job.

By using the availability data, the scheduler system may reduce the number of cluster node failures because the scheduler system allocates the jobs to particular cluster nodes that are available to perform the jobs. Reducing the number of cluster node failures improves system reliability and also provides scalability which is the ability to process a growing number of jobs.

In some implementations, the availability data may comprise data about one or more reasons why the cluster node is unavailable to execute the job. In one example, the reason may indicate that the cluster node is unavailable because the cluster node is executing too many jobs. For example, the number of jobs executed by the cluster node may be greater than or equal to a predetermined threshold value. The predetermined threshold value may be a value input by an administrative user. For example, the administrative user may input a threshold value of eight, such that a particular cluster node may be configured to execute no more than eight jobs.

The scheduler system may collect and store the reasons why the cluster nodes are unavailable to execute jobs. The scheduler system may analyze the reasons and allocate future jobs to the cluster nodes of the data warehouse based on the analysis of the reasons. By analyzing the reasons, the scheduler system may predict which cluster node is best suited to handle a new job.

In some implementations, the scheduler system uses the availability data to control the distribution of jobs to a particular node. For example, the scheduler system may determine that a particular cluster node overloads when at least five jobs are distributed to the particular node at one time. Based on the particular cluster node overloading when at least five jobs are distributed to the particular node, the scheduler system may determine to distribute no more than five jobs at one time to that particular node.

The cluster node may generate the availability data using metric data and threshold data. The metric data may comprise metric values which are indicative of one or more quantitative measurements of operation or performance of the cluster node. As described in more detail below, the metric values may relate to processor usage, memory usage, disk usage, bandwidth, and so forth. The threshold data may comprise threshold values which are associated with the metric values. A particular threshold value may be described as a value at which something happens. For example, the threshold data may be associated with a processor usage metric of a particular cluster node, and may comprise a value of ten. In this example, once the processor usage metric reaches a value of ten, the particular cluster node may generate availability data which indicates that the particular cluster node is unavailable to execute any more jobs.

The scheduler system may be configured to generate and store different threshold data for each of the cluster nodes. In one example, the administrative user may input the different threshold values into the scheduler system. In another example, the threshold values may be automatically determined and adjusted based on a historical analysis of collected availability data. The scheduler system may transmit different threshold values to different cluster nodes. By generating and storing the threshold values at the scheduler system, the threshold values are efficiently input and stored at a single location, rather than generating and storing the threshold data at each individual cluster node.

Illustrative System

FIG. 1 is a block diagram of a system 100 configured to provide scheduled job data to cluster nodes based on availability data. The system 100 includes a scheduler system 102 operatively coupled to a data warehouse 104 and a server 106 using a network. The scheduler system 102 may allocate jobs (e.g., information retrieval jobs) to the data warehouse 104. The scheduler system 102 may comprise one or more computing devices such as one or more servers.

The data warehouse 104 may comprise clusters 108(1), 108(2), . . . , 108(C). The clusters 108 may comprise a plurality of cluster nodes 110 which are configured to execute one or more jobs. The cluster nodes 110 comprise one or more computing devices, such as one or more servers. The cluster nodes 110 may or may not be similar in construction, components, modules, and so forth. The cluster nodes 110 may work in conjunction with one another, making computational requests to one another and providing responses to one another. In FIG. 1, the cluster 108(1) comprises the cluster nodes 110(1), . . . , 110(X) which are configured to execute jobs. The jobs may comprise one or more computational tasks. For example, a particular job may comprise a query job which retrieves information from a database.

The network facilitating communication between the scheduler system 102, the data warehouse 104 and the server 106 may include a variety of networks, such as a local network, a wide area network ("WAN"), broadcast network, a personal area network, a wired and wireless local area network ("LAN"), and so forth. In some implementations, the network includes at least one of Ethernet, Wi-Fi as promulgated by the Wi-Fi Alliance, 3G and 4G, Bluetooth as promulgated by the Bluetooth Special Interest Group, and so forth. The devices and systems described herein may be configured to directly connect to each other. The system 100 may include additional servers which communicate with the scheduler system 102, the data warehouse 104 and the server 106.

In FIG. 1, the scheduler system 102 includes a threshold datastore 112 which stores threshold data 114(1), and an availability datastore 116 which stores availability data 118(1). The threshold datastore 112 may receive and store different threshold data 114 for different cluster nodes 110. The threshold data 114(1) may comprise one or more threshold values associated with one or more metric values which are discussed in more detail below. A user (e.g., an administrative user) may use the scheduler system 102 to set the threshold values. For example, the administrative user may set the threshold value of the maximum number of jobs the cluster node 110(1) may execute to a value of ten. If the cluster node 110(1) executes ten or more jobs, the availability data 118(1) may indicate that the cluster node 110(1) is unavailable to perform any more jobs. In some implementations, the system 100 includes an external device (not shown) which is communicatively coupled to at least one of the scheduler system 102 or the cluster nodes 110. In these implementations, the external device may include the threshold datastore 112 and the availability datastore 116.

The availability data 118 may comprise data about the capacity of the cluster nodes 110(1), . . . , 110(X) to execute jobs. For example, the availability data 118(1) may indicate that the cluster node 110(1) is available or unavailable to execute a particular job. The cluster node 110(1) may be available to execute the job when a sufficient amount of resources are available on the cluster node 110(1). The cluster node 110(1) may be unavailable to execute the job for various reasons. For example, the cluster node 110(1) may not have a sufficient amount of resources to execute the job, or the cluster node 110(1) may be executing a critical job which requires that the cluster node 110(1) executes the critical job for a designated period of time. If the cluster node 110(1) is unavailable to execute a particular job, the scheduler system 102 may allocate the particular job to another cluster node 110(X) that is available to execute the particular job.

The availability data 118 may comprise data about one or more reasons why the cluster node 110(1) is unavailable to execute the job. In one example, the reason may indicate that the cluster node 110(1) is unavailable because the cluster node 110(1) is executing too many jobs based on the threshold value. For example, the number of jobs executed by the cluster node 110(1) may be greater than or equal to a predetermined threshold value. The scheduler system 102 may collect and store the one or more reasons why the cluster nodes 110(1), . . . , 110(X) are unavailable to execute jobs. The scheduler system 102 may analyze the collected reasons and allocate future jobs to the cluster nodes 110(1), . . . , 110(X) based on the analysis of the reasons. By analyzing the reasons, the scheduler system 102 may predict which cluster node 110(1), . . . , 110(X) is best suited to handle a new job.

In FIG. 1, the scheduler system 102 receives job data 120 from the server 106. The job data 120 may comprise data representing a request for the data warehouse 104 to execute one or more particular jobs. For example, the job data 120 may comprise a request to retrieve particular information from one or more databases. The job data 120 may be received from various internal business organizations, such as business analysis, sales/marketing, engineering, and so forth.

Once the job data 120 has been received, an analysis module 122 may use the job data 120 and the availability data 118 to generate cluster node identification data 124. The cluster node identification data 124 identifies which cluster node 110 will execute the job requested by the job data 120. In some implementations, the analysis module 122 performs a historical analysis on the availability data 118 to determine which cluster node 110 may execute received job data 120 efficiently. For example, a historical analysis may indicate that the cluster node 110(1) executes a particular job faster than the cluster node 110(X).

Using the cluster node identification data 124, an allocation module 126 generates and provides scheduled job data 128 to one or more cluster nodes 110. The scheduled job data 128 may comprise the job data 120 and the cluster node identification data 124. In FIG. 1, the allocation module 126 generates scheduled job data 128(1) and provides the scheduled job data 128(1) to the cluster node 110(1). The allocation module 126 also generates scheduled job data 128(2) and provides the scheduled job data 128(2) to another cluster node 110.

In FIG. 1, the scheduler system 102 provides the threshold data 114(1) to the cluster node 110(1). The scheduler system 102 may enable the administrative user to set the threshold data 114 for each cluster node 110. By setting the threshold data 114 at the scheduler system 102, the threshold data 114 may be efficiently set and stored for each of the cluster nodes 110 at one location, rather than setting the threshold data 114 at each of the cluster nodes 110.

The cluster node 110(1) includes a metric module 130 configured to generate metric data 132 which may be used to generate the availability data 118(1). The metric data 132 may comprise data representing one or more metric values indicative of one or more quantitative measurements of operation or performance of the cluster node 110(1) while executing one or more jobs.

Using the metric data 132 and the threshold data 114(1), an availability module 134 may generate the availability data 118(1). In some implementations, the availability module 134 generates the availability data 118(1) by determining whether any of the metric values are greater than or equal to any of the threshold values. If any of the metric values are greater than or equal to any of the threshold values, the availability data 118(1) may indicate that the cluster node 110(1) is unavailable to process new jobs. If the metric values are less than the threshold values, the availability data 118(1) may indicate that the cluster node 110(1) is available to process new jobs.

Once the scheduled job data 128(1) is received by the cluster node 110(1), a job processing module 136 may perform the requested job. The job processing module 136 may generate response data 138 which may include the information requested by the scheduled job data 128(1). The server 106 may include a service module 140 configured to process the response data 138. The service module 140 may be configured to generate the job data 120.

By using the availability data 118, the scheduler system 102 may reduce the number of cluster node 110 failures because the scheduler system 102 allocates the jobs to particular cluster nodes 110 that are available to perform the jobs. Reducing the number of cluster node 110 failures improves system reliability and also provides scalability which is the ability to process a growing number of jobs.

Figure 2:
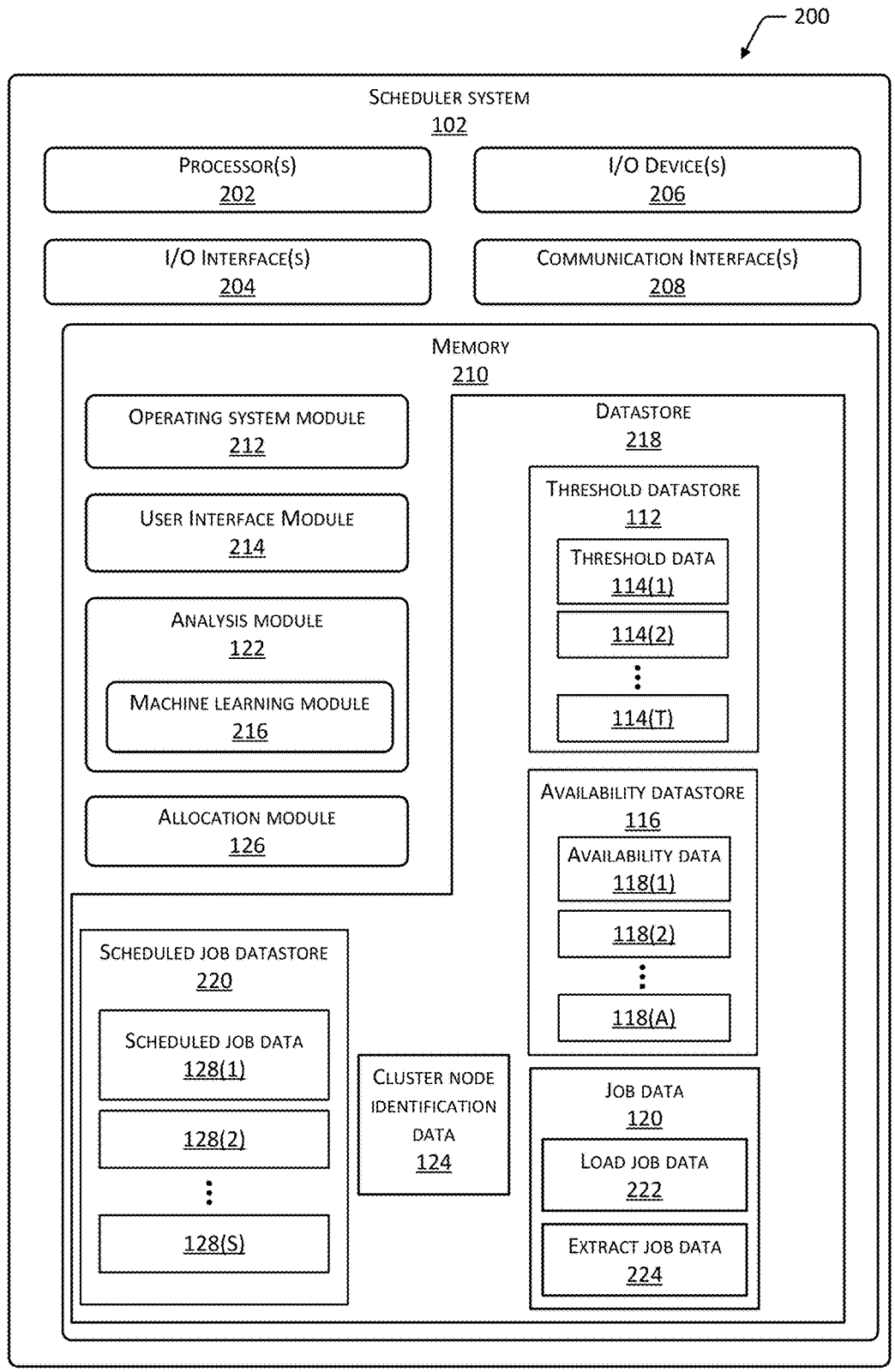
FIG. 2 is a block diagram of a scheduler system configured to generate cluster node identification data using job data and availability data.

FIG. 2 is a block diagram 200 of the scheduler system 102 configured to generate the cluster node identification data 124 using the job data 120 and the availability data 118. In some implementations the functions provided by the scheduler system 102 may be provided as a scheduler service executing on at least one computing device. The scheduler system 102 may include at least one processor 202 configured to execute stored instructions. The at least one processor 202 may comprise one or more cores.

The scheduler system 102 may include at least one input/output ("I/O") interface 204 which enables portions of the scheduler system 102 (e.g., the processor 202) to communicate with other devices. The I/O interface(s) 204 may include an inter-integrated circuit ("I2C"), a serial peripheral interface bus ("SPI"), a Universal Serial Bus ("USB"), an RS-232, and so forth. The at least one I/O interface 204 may be communicatively coupled to at least one I/O device 206. In some implementations, certain I/O devices 206 are physically incorporated with the scheduler system 102 or externally placed.

The scheduler system 102 may include at least one communication interface 208. The communication interface(s) 208 may be configured to provide communications between the scheduler system 102 and other devices, such as routers, access points, other scheduler systems 102, and so forth. The communication interface(s) 208 may connect to one or more networks. The scheduler system 102 may include at least one bus or other internal communications hardware or software that enables for the transfer of data between the various modules and components of the scheduler system 102.

As illustrated in FIG. 2, the scheduler system 102 may include at least one memory 210. The memory 210 may include at least one computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the scheduler system 102.

The memory 210 may include at least one operating system ("OS") module 212. The OS module 212 may be configured to manage hardware resources such as the I/O interface(s) 204, the I/O device(s) 206, the communication interface(s) 208, and provide various services to applications or modules executing on the processor(s) 202. The I/O device(s) 206 may include at least one of a display device or speakers. The memory 210 may also store at least one of the following modules which may be executed as foreground applications, background tasks, or daemons.

In some implementations, the memory 210 stores a user interface module 214 configured to provide a user interface to a user utilizing the I/O devices 206 and to accept inputs received from the I/O devices 206. The user interface may include one or more visual, audible, or haptic elements. For example, the user interface may be configured to provide a graphic user interface, an audible user interface, and so forth. Also stored in the memory 210 may be the analysis module 122 and the allocation module 126.

The analysis module 122 may use the job data 120 and the availability data 118 to generate cluster node identification data 124. In one example, the analysis module 122 uses the job data 120 to determine an amount of resources that will be required to perform the job requested. The availability data 118 may comprise information which indicates the job size particular cluster nodes 110 may be able to handle. Based on the amount of resources required and the indicated job sizes that the particular cluster nodes 110 may be able handle, the analysis module 122 may determine which cluster node 110 may be best suited to handle the job. As shown in FIG. 2, the analysis module 122 may include a machine learning module 216 which may be configured to perform a historical analysis of the availability data 118 to predict which cluster node 110 is best suited to handle a particular job. For example, a historical analysis may indicate that a particular cluster node 110 is often unavailable at a particular time of day. Because the particular cluster node 110 is often unavailable at the particular time of day, the machine learning module 216 may predict that the particular cluster node 110 will be unavailable at the particular time of day in the future. The prediction may save the consumption of certain resources which may be wasted by providing scheduled job data 128 to a cluster node 110 which may be unavailable.

In some implementations, the machine learning module 216 is configured to automatically determine one or more threshold values based on a historical analysis of the availability data 118. For example, the threshold value 406(1) for the number of jobs metric 402(8) of the cluster node 110(1) may be set to a value of "8". The machine learning module 216 may be configured to determine whether the current threshold value 406(1) of "8" is too high or too low. The machine learning module 216 may determine that the threshold value 406(1) of "8" is too low if the cluster node 110(1) includes additional resources while performing eight jobs. For example, while performing eight jobs, the cluster node 110(1) may have available processor and memory resources which may be used to perform additional jobs. If the machine learning module 216 determines that the threshold value is too low, the machine learning module 216 may cause the threshold value to increase. In another example, the machine learning module 216 may determine that current threshold value 406(1) of "8" is too high when the cluster node 110(1) becomes unstable and unable to perform jobs while executing less than eight jobs. For example, if the available processor and memory resources of the cluster node 110(1) become too low to perform any jobs while executing five jobs, the machine learning module 216 may automatically adjust the threshold value 406(1) from "8" to "4".

The allocation module 126 may generate and provide the scheduled job data 128. The allocation module 126 may use the cluster node identification data 124 to provide the scheduled job data 128 to the cluster nodes 110(1).

In some implementations, the memory 210 includes a datastore 218 for storing information. The datastore 218 may use a flat file, database, linked list, code, tree or other data structure to store the information. In some implementations, the datastore 218, or a portion thereof, may be distributed across at least one other device, such as another server, a network storage device, and so forth. As illustrated in FIG. 2, the datastore 218 may include the threshold datastore 112, the availability datastore 116, the job data 120, the cluster node identification data 124 and a scheduled job datastore 220.

The threshold datastore 112 may be configured to store the threshold data 114(1), 114(2), . . . , 114(T). The different threshold data 114(1), 114(2), . . . , 114(T) may be stored for different cluster nodes 110(1), . . . , 110(X). The threshold data 114(1), 114(2), . . . , 114(T) may comprise threshold values which are associated with the metric values. A particular threshold value may be described as a value at which something happens. For example, the threshold data 114(1) may be associated with a processor usage metric of the cluster node 110(1), and may comprise a value of ten. In this example, once the processor usage metric reaches a value of ten, the cluster node 110(1) may generate the availability data 118(1) which indicates that the cluster node 110(1) is unavailable to execute any more jobs. In some implementations, the external device (not shown) includes the threshold datastore 112. The external device may be configured to use the threshold data 114 and the metric data 132 to generate the availability data 118.

The availability datastore 116 may be configured to store the availability data 118(1), 118(2), . . . , 118(A). The different availability data 118(1), 118(2), . . . , 118(A) may be stored for different cluster nodes 110(1), . . . , 110(X). The availability data 118(1), 118(2), . . . , 118(A) may comprise data about the capacity of the cluster nodes 110(1), . . . , 110(X) to execute jobs. For example, the availability data 118(1) may indicate that the cluster node 110(1) is available or unavailable to execute a particular job. The cluster node 110(1) may be available to execute the job when a sufficient amount of resources are available on the cluster node 110(1). The cluster node 110(1) may be unavailable to execute the job for various reasons. For example, the cluster node 110(1) may not have a sufficient amount of resources to execute the job, or the cluster node 110(1) may be executing a critical job which requires that the cluster node 110(1) only executes the critical job for a designated period of time. If the cluster node 110(1) is unavailable to execute a particular job, the scheduler system 102 may allocate the particular job to another cluster node 110(X) that is available to execute the particular job.

The job data 120 may comprise data representing a request for the data warehouse 104 to execute one or more particular jobs. For example, the job data 120 may comprise a request to retrieve particular information from one or more databases. In some implementations, various internal business organizations (e.g., business analysis, sales/marketing, engineering, and so forth) may operate with the server 106, and cause the server 106 to transmit the job data 120 to the scheduler system 102. The job data 120 may comprise at least one of load job data 222 and extract job data 224. The load job data 222 may represent a request to load data into a database or table. The extract job data 224 may represent a request for a query to be run against a database. The cluster node identification data 124 may comprise data which identifies which cluster node 110 will execute the job requested by the job data 120.

The scheduled job datastore 220 may be configured to store the scheduled job data 128(1), 128(2), . . . 128(S). The scheduled job data 128(1), 128(2), . . . 128(S) may include the job data 120 and the cluster node identification data 124.

Figure 3:
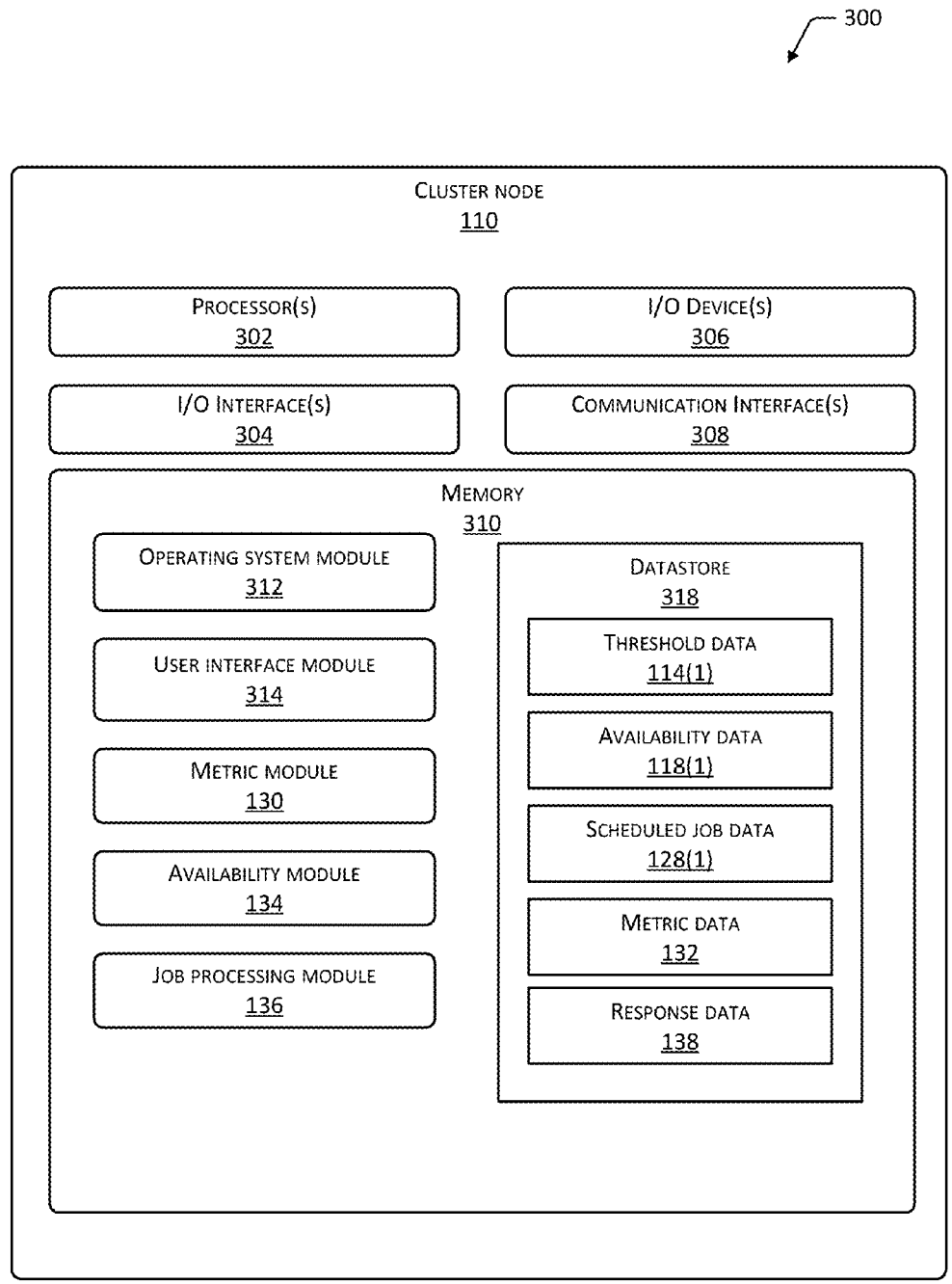
FIG. 3 is a block diagram of a cluster node configured to generate availability data using metric data and threshold data.

FIG. 3 is a block diagram 300 of the cluster node 110(1) configured to generate the availability data 118 using the metric data 132 and the threshold data 114(1). The cluster node 110 comprises at least one computing device configured to implement the functions described in this disclosure as one or more services.

The cluster node 110(1) may include at least one processor 302 configured to execute stored instructions. The at least one processor 302 may comprise one or more cores. The cluster node 110(1) may include at least one input/output ("I/O") interface 304 which enables portions of the cluster node 110(1) (e.g., the processor 302) to communicate with other devices. The I/O interface 304 may include I2C, SPI, USB, RS-232, and so forth. The at least one I/O interface 304 may be communicatively coupled to at least one I/O device 306. In some implementations, certain I/O devices 306 are physically incorporated with the cluster node 110(1) or externally placed.

The cluster node 110(1) may include at least one communication interface 308. The communication interface 308 may be configured to provide communications between the cluster node 110(1) and other devices, such as routers, access points, other cluster nodes 110, and so forth. The communication interface 308 may connect to one or more networks. The cluster node 110(1) may include at least one bus or other internal communications hardware or software that enables for the transfer of data between the various modules and components of the cluster node 110(1).

As illustrated in FIG. 3, the cluster node 110(1) may include at least one memory 310. The memory 310 may include at least one computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the cluster node 110(1).

The memory 310 may include at least one operating system ("OS") module 312. The OS module 312 may be configured to manage hardware resources such as the I/O interface 304, the I/O device 306, the communication interface 308, and provide various services to applications or modules executing on the processor 302. The I/O device 306 may include at least one of a display device or speakers. The memory 310 may also store at least one of the following modules which may be executed as foreground applications, background tasks, or daemons.

In some implementations, the memory 310 stores a user interface module 314 configured to provide a user interface to a user utilizing the I/O devices 306 and to accept inputs received from the I/O devices 306. The user interface may include one or more visual, audible, or haptic elements. For example, the user interface may be configured to provide a graphic user interface, an audible user interface, and so forth. Also stored in the memory 310 may be the metric module 130, the availability module 134 and the job processing module 136.

The metric module 130 may be configured to generate the metric data 132. In one implementation, the metric module 130 generates the metric data 132 while or after performing computational tasks. In another implementation, the metric module 130 may execute benchmark tests using predetermined input, and so forth. In this implementation, the benchmark may be executed periodically, such as every five minutes. The benchmark may run a number of tests against the cluster node 110. In some implementations, the external device (not shown) may include the metric module 130. The external device may generate and store the metric data 132. In other implementations, the scheduler system 102 includes the metric module 130 and causes the external device to store the metric data 132.

The availability module 134 may generate the availability data 118(1). In some implementations, the availability module 134 generates the availability data 118(1) by determining whether any of the metric values are greater than or equal to any of the threshold values. If any of the metric values are greater than or equal to any of the threshold values, the availability data 118(1) may indicate that the cluster node 110(1) is unavailable to process new jobs. If none of the metric values are greater than or equal to any of the threshold values, the availability data 118(1) may indicate that the cluster node 110(1) is available to process new jobs. In some implementations, the external device (not shown) may include the availability module 134. In these implementations, the external device may generate the availability data 118, and provide the availability data 118 to the scheduler system 102. In other implementations, the scheduler system 102 includes the availability module 130 and causes the external device to store the generated availability data 118.

The job processing module 136 may be configured to generate the response data 138. The response data 138 may comprise information requested by the job data 120.

In some implementations, the memory 310 includes a datastore 318 for storing information. The datastore 318 may use a flat file, database, linked list, code, tree or other data structure to store the information. In some implementations, the datastore 318, or a portion thereof, may be distributed across at least one other device, such as another server, a network storage device, and so forth. As illustrated in FIG. 3, the datastore 318 may include the threshold data 114(1), the availability data 118(1), the scheduled job data 128(1), the metric data 132, and the response data 138.

The threshold data 114(1) may comprise threshold values which are associated with the metric values. For example, the threshold data 114(1) may be associated with a processor usage metric of the cluster node 110(1), and may comprise a value of ten. In this example, once the processor usage metric reaches a value of ten, the cluster node 110(1) may generate the availability data 118(1) which indicates that the cluster node 110(1) is unavailable to execute any more jobs.

The availability data 118(1) may comprise data about the capacity of the cluster nodes 110(1) to execute jobs. For example, the availability data 118(1) may indicate that the cluster node 110(1) is available or unavailable to execute a particular job.

In FIG. 3, the scheduled job data 128(1) may comprise data representing a request for the cluster node 110(1) to execute one or more particular jobs. The scheduled job data 128(1) may include the job data 120 and the cluster node identification data 124.

The metric data 132 may comprise data representing one or more metric values indicative of one or more quantitative measurements of operation or performance of the cluster node 110(1) while executing one or more jobs. The metric data 132 may be used to generate the availability data 118(1). The response data 138 may comprise information requested by the job data 120.

Figure 4:
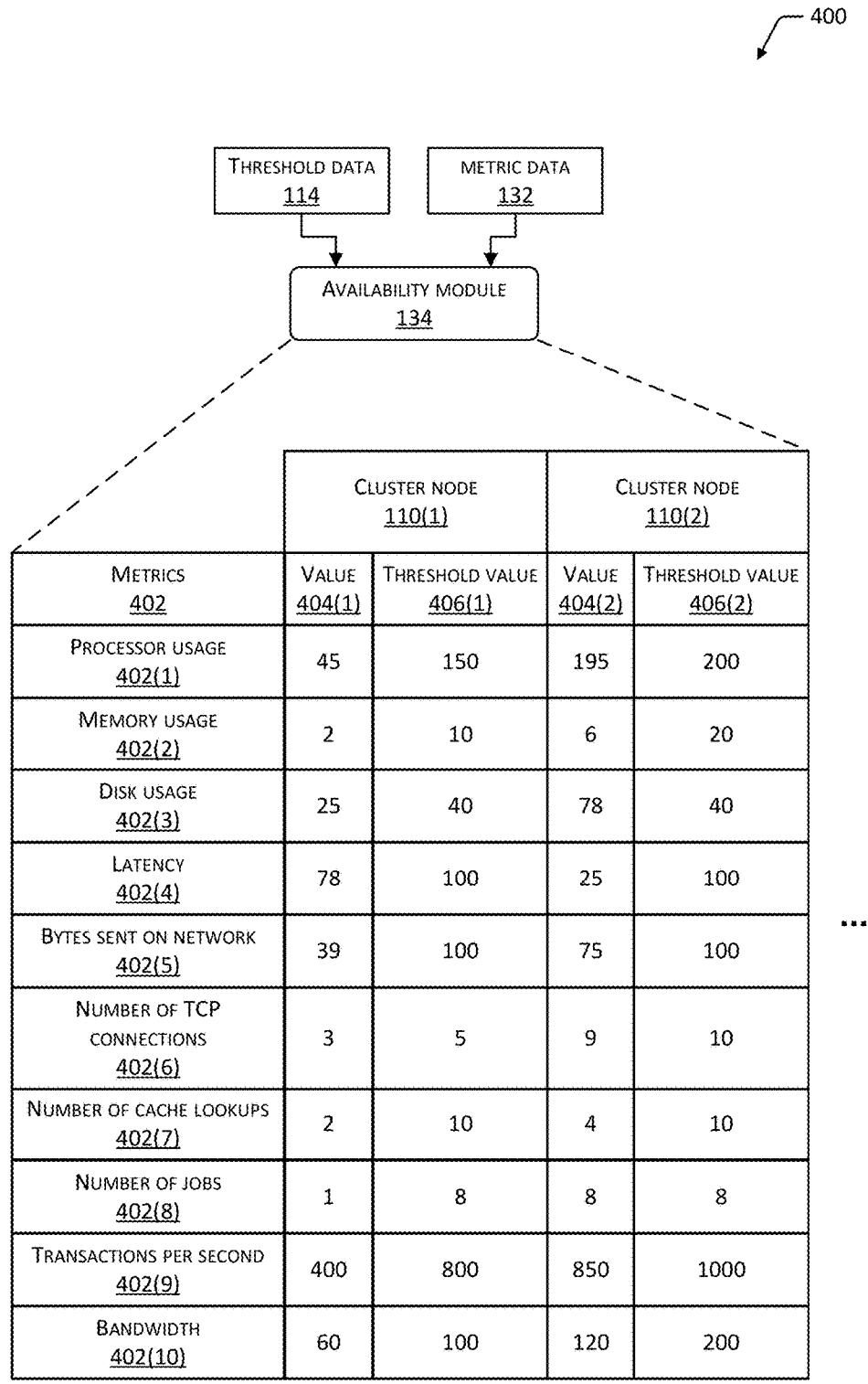
FIG. 4 illustrates a comparison of metric values and threshold values associated with the metric values.

FIG. 4 is an illustration 400 of a comparison of metric values and threshold values to determine the availability data 118 for cluster nodes 110. The availability module 134 accesses the threshold data 114 and the metric data 132. The metric data 132 may be stored in log files or other data structures. The metric data 132 includes metrics 402.

The metrics 402 comprise data which may be qualitative or quantitative about one or more aspects of operation of the cluster nodes 110. In FIG. 4, the metrics 402 include processor usage 402(1), memory usage 402(2), disk usage 402(3), latency 402(4), bytes sent on network per second 402(5), number of TCP connections 402(6), number of cache lookups 402(7), number of jobs 402(8), transactions per second 402(9), bandwidth 402(10), and so forth. The metrics may have associated values 404. For example, in FIG. 4, the memory usage 402(2) may indicate "2" indicating a quantity of memory used to execute jobs.

The metrics 402 may be associated with threshold values 406. For example, the processor usage metric 402(1) is associated with the threshold value 406(1) for the cluster node 110(1), and is associated with the threshold value 406(2) for the cluster node 110(2). The availability module 134 may compare the value 404 with the threshold values 406 to determine the availability data 118. For each cluster node 110, if any of the values 404 are equal to or greater than any corresponding threshold values 406, the availability module 134 may generate the availability data 118 indicating that the cluster node 110 is unavailable. For example, in FIG. 4, the value 404(2) of the number of jobs metric 402(8) for the cluster node 110(2) is equal to the corresponding threshold value 406(2). That is, the value 404(2) for the number of jobs metric 402(8) for the cluster node 110(2) is "8", and the corresponding threshold value 406(2) is "8". In response to the cluster node 110(2) executing a number of jobs that is equal to the threshold value of eight, the availability module 134 may generate availability data 118 indicating that the cluster node 110(2) is unavailable to execute one or more jobs. The availability data 118 may also comprise data about the reason that the cluster node 110(2) is unavailable. In this example, the reason may comprise data indicating that the number of jobs being executed was too high. Using these techniques, the availability module 134 is thus able to generate the availability data 118.

In some implementations, the metrics 402 comprise data about database resources. For example, the database resources may include data about the locking and latching mechanisms of a database, the transaction rate within the database, or the number of bytes sent between client nodes.

FIG. 5 illustrates examples of the availability data 118(1) and 118(2) which include data about availability status and reasons for unavailability. As shown in FIG. 5, the availability data 118(1) may include data illustrated in an availability table 502(1) which includes the following fields: cluster node identification value 504(1), status 506(1), reason for unavailability 508(1), and date 510(1).

The cluster node identification value 504(1) may comprise a unique identifier that is associated with one of the cluster nodes 110. In FIG. 5, cluster node identification value 504(1) has a value of "1", which is a unique identifier associated with one of the cluster nodes 110.

In FIG. 5, the status 506(1) identifies whether the cluster node 110 identified by the cluster node identification value 504(1) is available to perform one or more jobs. The reason for unavailability 508(1) comprises information about one or more reasons why the cluster node 110 identified by the cluster node identification value 504(1) is unavailable. The date 510(1) comprises information about the date in which the status 506(1) and the reason for unavailability 508(1) were collected and stored in the availability table 502(1).

As illustrated by the availability table 502(1), the status 506(1) for the "01JUL2013" date 510(1) has a value of "Available." The available status 506(1) indicates that the cluster node 110 identified by the cluster node identification value 504(1) was able to execute a particular job on 01JUL2013.

The status 506(1) for the "20JUN2013" date 510(1) has a value of "Unavailable." The unavailable status 506(1) indicates that the cluster node 110 identified by the cluster node identification value 504(1) was unavailable to execute a particular job on 20JUN2013. The reason for unavailability 508(1) has a value of "Processor usage value exceeds threshold value," which indicates that the cluster node 110 identified by the cluster node identification value 504(1) was unable to execute the particular job because the processor usage of the cluster node 110 was too high.

The status 506(1) for the "15JUN2013" date 510(1) has a value of "Unavailable." The unavailable status 506(1) indicates that the cluster node 110 identified by the cluster node identification value 504(1) was unavailable to execute a particular job on 15JUN2013. The reason for unavailability 508(1) has a value of "Number of jobs exceeds threshold value," which indicates that the cluster node 110 identified by the cluster node identification value 504(1) was unable to execute the particular job because the cluster node 110 was executing too many jobs.

The status 506(1) for the "10JUN2013" date 510(1) has a value of "Unavailable." The unavailable status 506(1) indicates that the cluster node 110 identified by the cluster node identification value 504(1) was unavailable to execute a particular job on 10JUN2013. The reason for unavailability 508(1) has a value of "Memory usage value exceeds threshold value," which indicates the cluster node 110 was consuming too much memory to execute the particular job.

The status 506(1) for the "05JUN2013" date 510(1) has a value of "Available." The available status 506(1) indicates that the cluster node 110 identified by the cluster node identification value 504(1) was able to execute a particular job on 05JUN2013.

The status 506(1) for the "01JUN2013" date 510(1) has a value of "Available." The available status indicates that the cluster node 110 identified by the cluster node identification value 504(1) was able to execute the job on 01JUN2013.

As shown in FIG. 5, the availability data 118(2) may include data illustrated in an availability table 502(2) which includes the following fields: cluster node identification value 504(2), status 506(2), reason for unavailability 508(2) and date 510(2). The cluster node identification value 504(2) has a value of "2", which is a unique identifier of one of the cluster nodes 110.

The status 506(2) for the "02JUL2013" date 510(2) has a value of "Available." The available status 506(2) indicates that the cluster node 110 identified by the cluster node identification value 504(2) was able to execute a particular job on 02JUL2013.

The status 506(2) for the "21JUN2013" date 510(2) has a value of "Unavailable." The unavailable status 506(2) indicates that the cluster node 110 identified by the cluster node identification value 504(2) was unavailable to execute a particular job on 21JUN2013. The reason for unavailability 508(2) has a value of "Memory usage value exceeds threshold value," which indicates the cluster node 110 was consuming too much memory to execute the particular job.

The status 506(2) for the "16JUN2013" date 510(2) has a value of "Unavailable." The unavailable status 506(2) indicates that the cluster node 110 identified by the cluster node identification value 504(2) was unavailable to execute a particular job on 16JUN2013. The reason for unavailability 508(2) has a value of "Memory usage value exceeds threshold value," which indicates the cluster node 110 was consuming too much memory to execute the particular job.

The status 506(2) for the "11JUN2013" date 510(2) has a value of "Unavailable." The unavailable status 506(2) indicates that the cluster node 110 identified by the cluster node identification value 504(2) was unavailable to execute a particular job on 11JUN2013. The reason for unavailability 508(2) has a value of "Memory usage value exceeds threshold value," which indicates the cluster node 110 was consuming too much memory to execute the particular job.

The status 506(2) for the "06JUN2013" date 510(2) has a value of "Available." The available status 506(2) indicates that the cluster node 110 identified by the cluster node identification value 504(2) was able to execute a particular job on 06JUN2013.

The status 506(2) for the "02JUN2013" date 510(2) has a value of "Unavailable." The unavailable status 506(2) indicates that the cluster node 110 identified by the cluster node identification value 504(2) was unavailable to execute a particular job on 02JUN2013. The reason for unavailability 508(2) has a value of "Memory usage value exceeds threshold value," which indicates the cluster node 110 was consuming too much memory to execute the particular job.

The scheduler system 102 may perform a historical analysis of the availability data 118(2) illustrated in FIG. 5 to allocate the scheduled job data 128. For example, the historical analysis may provide a prediction that the cluster node 110 identified by the cluster node identification value 504(2) may not be available because it may be likely that the memory usage will exceed a threshold value. The prediction may cause the performance time of the jobs to decrease because the scheduler system 102 will not waste any resources by attempting to allocate a particular job to the cluster node 110 identified by the cluster node identification value 504(2). That is, the prediction may increase efficiency by reducing the total job performance time.

FIG. 6 illustrates an example threshold datastore 112 which includes different threshold values 406 associated with different cluster nodes 110(1), 110(2), 110(3), . . . , 110(X). As shown in FIG. 6, the threshold datastore 112 may include data illustrated in a threshold table 602 which include the metrics 402 and the associated threshold values 406 for the cluster nodes 110(1), 110(2), . . . , 110(X). The threshold values 406(1), 406(2), 406(3) may have been set by an administrative user operating with the scheduler system 102. The threshold values 406(1), 406(2), 406(3) may be adjusted or modified by the administrative user. The administrative user may adjust or modify the threshold values 406(1), 406(2), 406(3) to meet certain performance goals.

Figure 7:
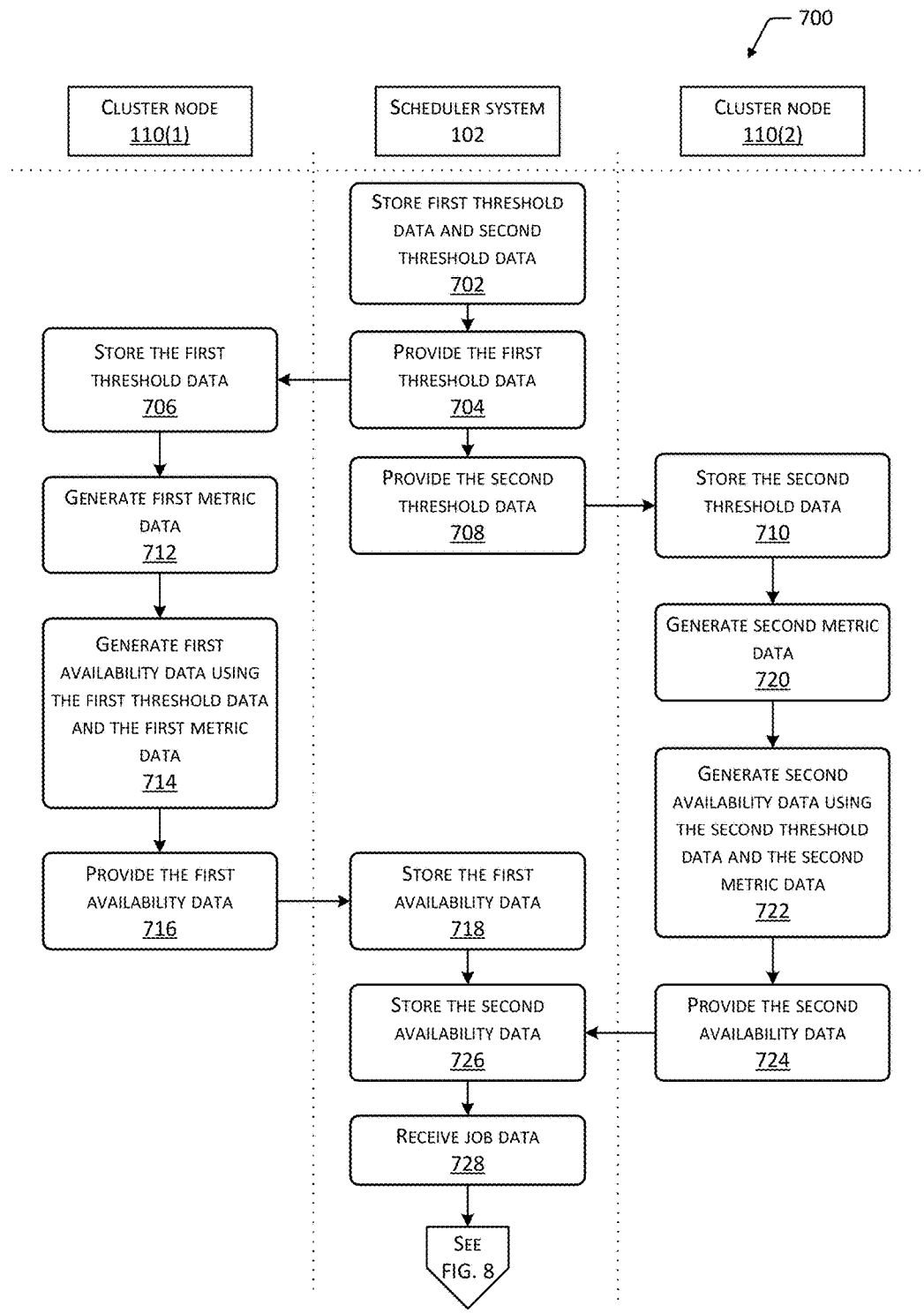
FIGS. 7 and 8 depict a flow diagram illustrating a process of receiving availability data from cluster nodes and providing scheduled job data to a cluster node based on cluster node identification data.
Figure 8:
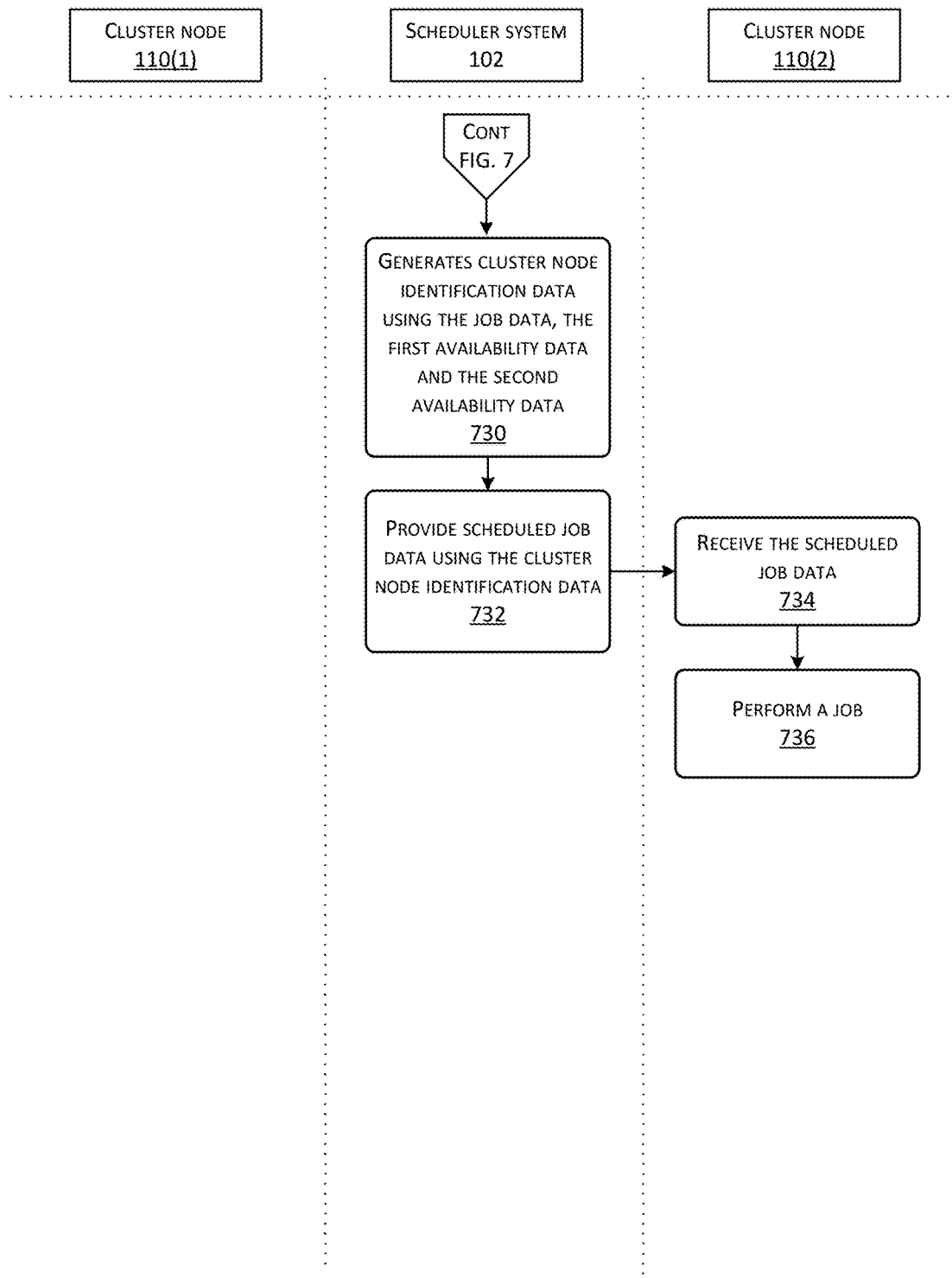

FIGS. 7 and 8 depict a flow diagram illustrating a process 700 of receiving the availability data 118 from cluster nodes 110(1) and 110(2) and providing the scheduled job data 128(1) to the cluster node 110(2) based on the cluster node identification data 124. Although the process 700 is described with reference to the flow diagram illustrated in FIGS. 7-8, other methods of performing the acts associated with the process 700 may be used. For example, the order of many of the steps may be changed, some of the steps described may be optional, and additional steps may be included.

At block 702, the scheduler system 102 stores the first threshold data 114(1) and the second threshold data 114(2). The threshold data 114(1) and 114(2) may represent threshold values 406 associated with metric values. The scheduler system 102 may store the first threshold data 114(1) and the second threshold data 114(2) in response to the administrative user operating with an input device of the scheduler system 102 to enter in the threshold values 406. For example, the administrative user may enter the threshold value of "100" for the first cluster node 110(1).

At block 704, the scheduler system 102 provides the first threshold data 114(1) to the cluster node 110(1). In some implementations, the first threshold data 114(1) is scheduled to be provided to the cluster node 110(1) at a time in the future, for example, nightly or weekly. At block 706, the cluster node 110(1) stores the first threshold data 114(1).

At block 708, the scheduler system 102 provides the second threshold data 114(2) to the cluster node 110(2). In some implementations, the second threshold data 114(2) is scheduled to be provided to the cluster node 110(2) at a time in the future, for example, nightly or weekly. At block 710, the cluster node 110(2) stores the second threshold data 114(2).

At block 712, the cluster node 110(1) generates first metric data 132(1). The first metric data 132(1) may be generated while or after the cluster node 110(1) performs computational tasks.

At block 714, the cluster node 110(1) generates first availability data 118(1) using the first threshold data 114(1) and the first metric data 132(1). In some implementations, the cluster node 110(1) may be configured to generate the first availability data 118(1) after an occurrence of a predetermined number of computational tasks. For example, the cluster node 110(1) may be configured to generate the first availability data 118(1) for every one thousand computational tasks to minimize the load resulting from generating first availability data 118(1). In some implementations, to minimize the load resulting from generating first availability data 118(1), the cluster node 110(1) may generate first availability data 118(1) at randomly generated time periods. In one example, the cluster node 110(1) includes a random time interval generation module configured to generate random time intervals. Based on the random time intervals, the cluster node 110(1) may generate first availability data 118(1). In one example, a historical analysis of the generated first availability data 118(1) may show that first availability data 118(1) was generated on January 1 at 8:02 a.m. local time, January 1 at 8:55 a.m. local time, January 1 at 12:32 p.m. local time, January 1 at 6:43 p.m. local time, and so forth. In another example, the generated first availability data 118(1) may show that the first availability data 118(1) was generated on July 8 at 9:32 p.m. local time, July 10 at 1:05 a.m. local time, July 17 at 4:57 p.m. local time, August 2 at 2:35 p.m. local time, and so forth.

At block 716, the cluster node 110(1) provides the first availability data 118(1) to the scheduler system 102. The cluster node 110(1) may be configured to provide the first availability data 118(1) after an occurrence of a predetermined number of computational tasks. For example, the cluster node 110(1) may be configured to provide the first availability data 118(1) for every one hundred computational tasks to minimize the load resulting from providing the first availability data 118(1) to the scheduler system 102. In some implementations, to minimize the load resulting from providing the first availability data 118(1), the cluster node 110(1) may provide the first availability data 118(1) at randomly generated time periods.

At block 718, the scheduler system 102 stores the first availability data 118(1). The first availability data 118(1) may be stored at the availability datastore 116.

At block 720, the cluster node 110(2) generates second metric data 132(2). The second metric data 132(2) may be generated while or after the cluster node 110(2) performs computational tasks.

At block 722, the cluster node 110(2) generates second availability data 118(2) using the second threshold data 114(2) and the second metric data 132(2). The cluster node 110(2) may be configured to generate the second availability data 118(2) after an occurrence of a predetermined number of computational tasks. To minimize the load resulting from generating second availability data 118(2), the cluster node 110(2) may generate second availability data 118(2) at randomly generated time periods.

At block 724, the cluster node 110(2) provides the second availability data 118(2) to the scheduler system 102. The cluster node 110(2) may be configured to provide the second availability data 118(2) after an occurrence of a predetermined number of computational tasks. In some implementations, the cluster node 110(2) may provide the second availability data 118(2) at randomly generated time periods.

At block 726, the scheduler system 102 stores the second availability data 118(2). The second availability data 118(2) may be stored at the availability datastore 116.

At block 728, the scheduler system 102 receives the job data 120. The job data 120 may comprise data representing a request for the data warehouse 104 to execute one or more particular jobs. For example, the job data 120 may comprise a request to retrieve particular information from one or more databases. In some implementations, various internal business organizations (e.g., business analysis, sales/marketing, engineering, and so forth) may operate with the server 106, and cause the server 106 to transmit the job data 120 to the scheduler system 102.

At block 730, the scheduler system 102 generates the cluster node identification data 124 using the job data 120, the first availability data 118(1), and the second availability data 118(2). The cluster node identification data 124 may comprise data that identifies which cluster node 110 will execute the job requested by the job data 120.

At block 732, the scheduler system 102 provides the scheduled job data 128 using the cluster node identification data 124. At block 734, the cluster node 110(2) receives the scheduled job data 128.

At block 736, the cluster node 110(2) performs a job. For example, the cluster node 110(2) may run a query against a database.

As discussed above, the system 100 may include the external device (not shown) which may generate the availability data 118. The external device may include an external database which stores the threshold data 114 and the metric data 132, which are used to generate the availability data 118. In one example, the external device may include the threshold datastore 112 and the metric module 130. In some implementations, the scheduler system 102 includes the cluster node 110(1) includes availability module 134 and the external device includes the threshold datastore 112 and stores the metric data 132. In these implementations, the cluster node 110(1) may receive the threshold data 114(1) and the metric data 134 from the external device to generate the availability data 118(1).

Figure 9:
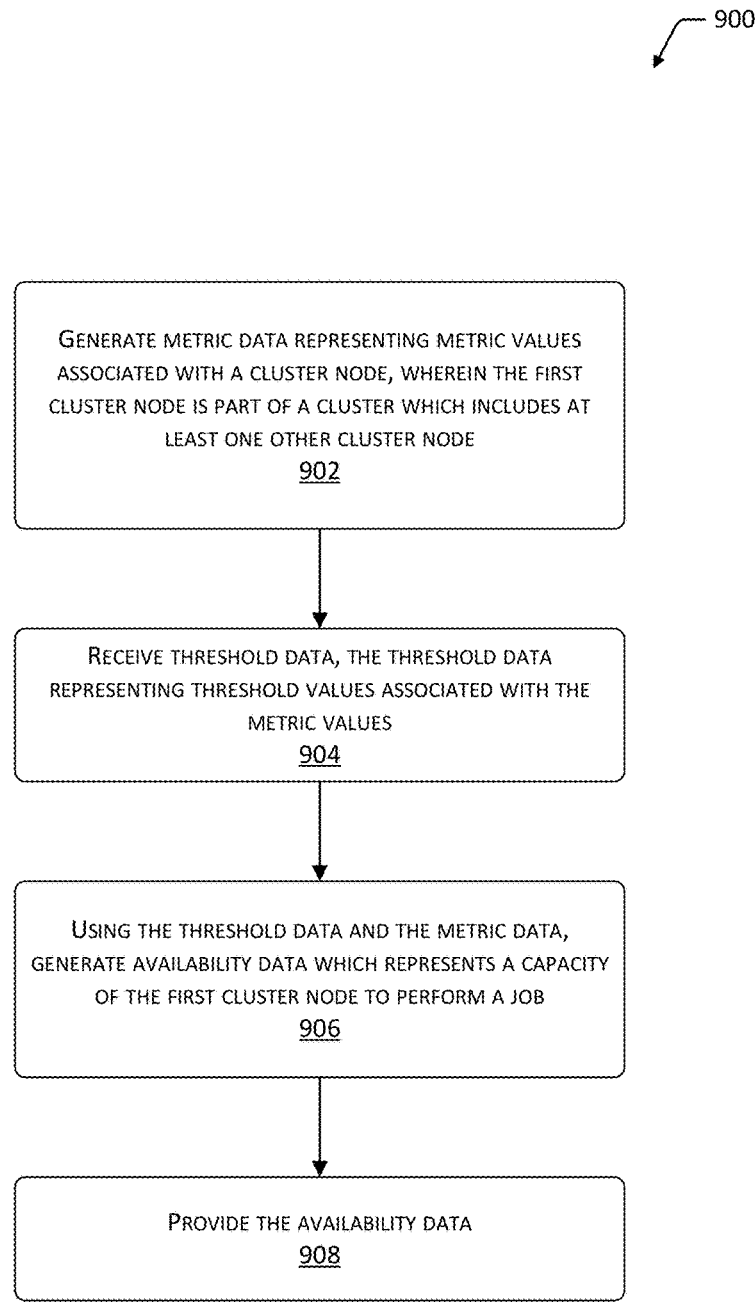
FIG. 9 is a flow diagram illustrating a process of generating availability data using threshold data and metric data.

FIG. 9 is a flow diagram illustrating a process 900 of generating the availability data 118 using the threshold data 114 and metric data 132. One or more cluster nodes 110 may implement the process 900. Although the process 900 is described with reference to the flowchart illustrated in FIG. 9, many other methods performing the acts associated with the process 900 may be used. For example, the order of the steps may be changed, some of the steps described may be optional, and additional steps may be included.

At block 902, the cluster node 110(1) generates the metric data 132 representing metric values associated with the first cluster node 110(1) wherein the first cluster node 110(1) is part of the cluster 108(1) which includes at least one other cluster node 110. The metric values may be indicative of one or more quantitative measurements of operation of the first cluster node 110(1). In one implementation, the cluster node 110(1) generates the metric data 132 while or after performing computational tasks. In another implementation, the cluster node 110(1) may execute benchmark tests using predetermined input, and so forth.

At block 904, the cluster node 110(1) receives the threshold data 114, the threshold data 114 representing threshold values associated with the metric values. In some implementations, the cluster node 110(1) receives the threshold data 114 from the scheduler system 102. In other implementations, the cluster node 110(1) may receive the threshold data 114 from a different computing device such as a server. The cluster node 110(1) may receive the threshold data 114 in response to a user operating with the scheduler system 102 and requesting that the scheduler system 102 provide the threshold data 114 to the cluster node 110(1). In some implementations, the threshold data 114 is scheduled to be provided to the cluster node 110(1) at a time in the future, for example, nightly or weekly.

At block 906, using the threshold data 114 and the metric data 132, the cluster node 110(1) generates the availability data 118 which represents a capacity of the first cluster node 110(1) to perform a job. In some implementations, the cluster nodes 110 generate the availability data 118 based on contracts or service level agreements which may specify designated amounts of resources which the cluster nodes 110 may consume for a designated period of time. In response to the one or more the cluster nodes 110 consuming more resources than the specified designated amount, the availability data 118 may indicate that the cluster node 110 is unavailable. In one example, the cluster node 110 may generate the availability data 118 that indicates that the cluster node 110 is unavailable based on database resources. For example, the cluster node 110 may be unavailable when a database of the cluster node 110 does not have enough memory to perform a job. In another example, the cluster node 110 may be unavailable when the bytes sent between cluster nodes 110 are equal to or greater than a threshold value 406.

At block 908, the cluster node 110(1) provides the availability data 118. The cluster node 110(1) may be configured to provide the availability data 118 after an occurrence of a predetermined number of computational tasks. In some implementations, the cluster node 110(1) may provide the availability data 118 at randomly generated time periods.

Figure 10:
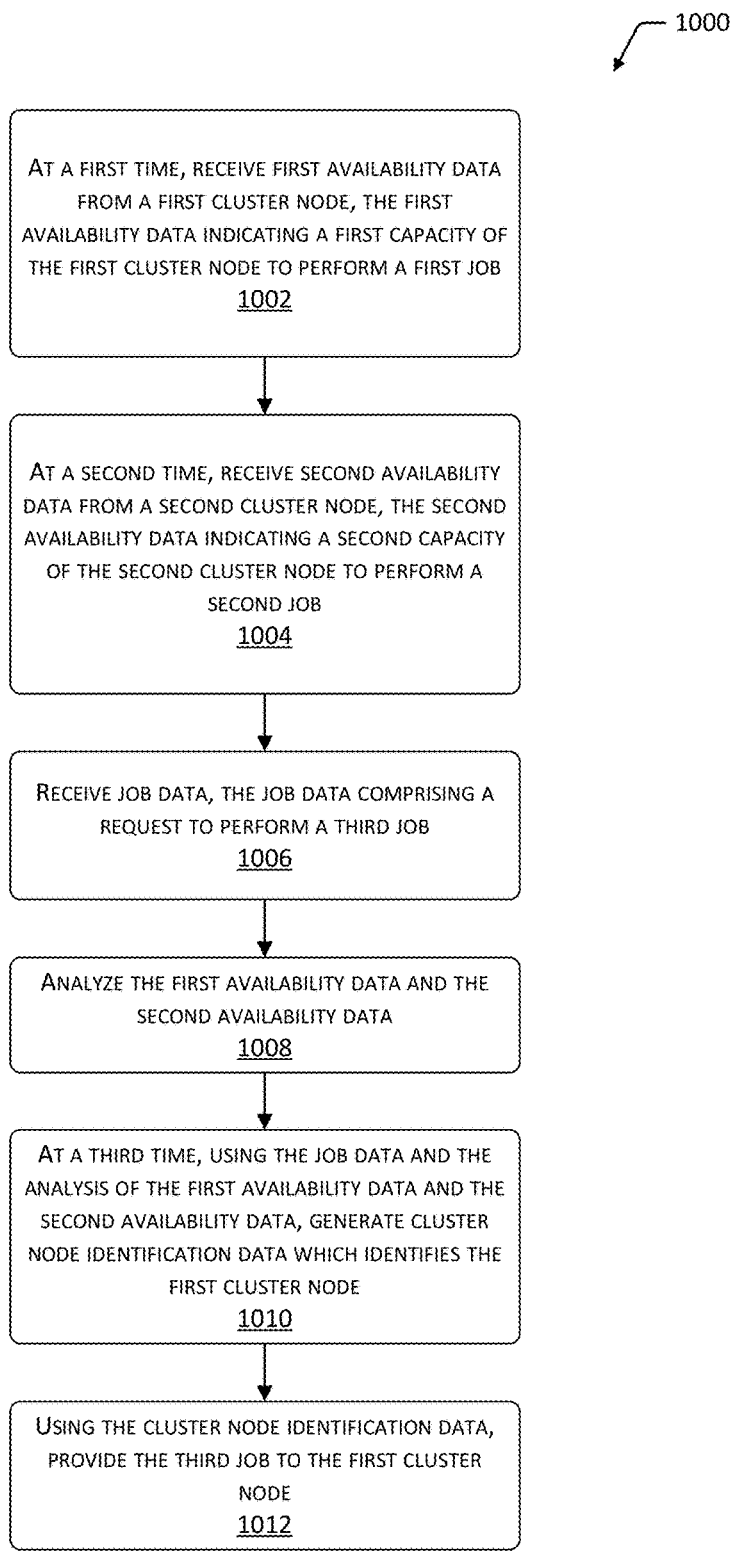
FIG. 10 is a flow diagram illustrating a process of identifying a cluster node using a comparison of availability data.

FIG. 10 is a flow diagram illustrating a process 1000 of identifying the cluster node 110(1) based on an analysis of availability data 118. The cluster node 110(1) may implement the process 1000. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At block 1002, at a first time, the scheduler system 102 receives the first availability data 118(1) from the first cluster node 110(1), the first availability data 118(1) indicating a first capacity of the first cluster node 110(1) to perform a first job. At block 1004, at a second time, the scheduler system 102 receives the second availability data 118(2) from the second cluster node 110(2), the second availability data 118(2) indicating a second capacity of the second cluster node 110(2) to perform a second job. The scheduler system 102 may receive the availability data 118(1) and 118(2) at predetermined time periods, or while the cluster nodes 110(1) and 110(2) execute one or more jobs.

At block 1006, the scheduler system 102 receives the job data 120, the job data 120 comprising a request to perform a third job. This third job may comprise a third computational task. The scheduler system 102 may receive the job data 120 from one or more of the servers 106 which may be operated from various internal business organizations.

At block 1008, responsive to the receipt of the job data 120, the scheduler system 102 analyzes the first availability data 118(1) and the second availability data 118(2). For example, the scheduler system 102 may analyze the first availability data 118(1) and the second availability data 118(2) by performing a historical analysis of the availability data 118 stored at the availability datastore 116. The historical analysis may enable the scheduler system 102 to predict which cluster node 110 will be available to perform future jobs.

At block 1010, at a third time, using the job data 120 and the comparison of the first availability data 118(1) and the second availability data 118(2), the scheduler system 102 generates the cluster node identification data 124 which identifies the cluster node 110 to perform the jobs. For example, in this illustration the identification may indicate the first cluster node 110(1). However, in other implementations the second cluster node 110(2) may be identified. At block 1012, using the cluster node identification data 124, the scheduler system 102 provides the third job to the first cluster node 110(1). In other implementations, the scheduler system 102 may provide the third job to other cluster nodes 110 such as the second cluster node 110(2).

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
  at least one computing device configured to implement one or more services, wherein the one or more services are configured to:
  repeatedly determining availability data by performing the steps of:
    access metric data from a datastore, the metric data representing one or more metric values indicative of one or more quantitative measurements of operation of a plurality of cluster nodes while performing previous jobs;
    access, from a threshold datastore, threshold data associated with the metric data associated with the plurality of cluster nodes, the threshold data representing one or more threshold values associated with respective ones of the metric values associated with the plurality of cluster nodes;
    compare the one or more threshold values to the respective ones of the one or more metric values to determine whether the one or more threshold values are greater than or equal to the respective ones of the one or more metric values;
    using the metric data and the threshold data, generate availability data, for the plurality of cluster nodes, that indicates a capacity of the plurality of cluster nodes to perform the received job based on the one or more threshold values being greater than or equal to the respective ones of the one or more metric values, wherein if the threshold values associated with the first or second cluster nodes is greater than or equal to the one or more respective metric values for each cluster node the availability data will indicate that cluster node is available to process new jobs and if less than the cluster node is unavailable; and
    saving the availability data to a data store indicating historical availability data of previous jobs for the plurality of cluster nodes;
  receive job data comprising a request to perform a job comprising a first computational task;
  at a second time, responsive to the receipt of the job data, determine availability data entries of the plurality of cluster nodes in the data store generated proximate to the second time;
  analyze, by a processor of a scheduler system, the job data and the determined availability data entries associated with the plurality of cluster nodes;
  at a third time, using the job data and the analysis of the determined availability data entries to generate, by the scheduler system, cluster node identification data comprising data identifying one of the plurality of cluster nodes to execute the first computational task, wherein the cluster node identification data indicates which of the plurality of nodes is best suited to execute the first computational task;
  allocate the job to the one of the plurality of cluster nodes identified by the cluster node identification data; and
  execute the job at the one of the plurality of cluster nodes identified by the cluster node identification data.

2. The system of claim 1, wherein:
  the job data is received from the scheduler system that is configured to allocate one or more jobs to the system.

3. The system of claim 1, wherein an input device is enabled to configure the one or more threshold values.

4. A method, comprising:
  repeatedly determining availability data by performing the steps of:
    generating metric data representing one or more metric values indicative of one or more quantitative measurements of operation of a plurality of cluster nodes while performing previous jobs comprising computational tasks, the plurality of cluster nodes including a first cluster node and a second cluster node;
    receiving threshold data for the plurality of cluster nodes, the threshold data representing one or more threshold values associated with the one or more metric values associated with the plurality of cluster nodes;
    comparing the one or more threshold values to a respective metric value to determine whether the one or more threshold values are greater than or equal to the respective metric value;
    generating availability data, the availability data indicating a capacity of the plurality of cluster nodes to perform a new job based on the one or more threshold values being less than, equal to, or greater than the respective metric value, the new job comprising a computational task, wherein if the threshold values associated with respective ones of the plurality of cluster nodes is greater than or equal to the one or more respective metric values the availability data will indicate that the respective ones of the plurality of cluster nodes is available to process new jobs and if less than the respective ones of the plurality of cluster nodes is unavailable;
    saving availability data to a data store indicating historical availability data of previous jobs for the plurality of cluster nodes;
  at a second time, responsive to the receipt of job data including a request to perform the new job, determine availability data entries of the plurality of cluster nodes in the data store generated at and near the second time;
  analyzing by a processor of a scheduler system the new job and the determined availability data entries for the plurality of cluster nodes to generate cluster node identification data identifying one of the plurality of cluster nodes to execute the new job, wherein the cluster node identification data indicates which node is best suited to handle the job;

allocating the new job to the one of the plurality of cluster nodes identified by the cluster node identification data to be best suited to execute the new job; and executing the new job at the one of the plurality of cluster nodes identified by the cluster node identification data to be best suited to execute the new job.

5. The method of claim 4, wherein the availability data indicates that the first cluster node is unavailable to perform the new job, the unavailability being determined based on the first cluster node currently performing a critical job which requires that the first cluster node perform the critical job for a designated period to time.

6. The method of claim 4, enabling a user to operate with an input device to configure the one or more threshold values.

7. The method of claim 4, wherein the availability data is generated at predetermined time periods.

8. The method of claim 4, wherein the availability data indicates that the first cluster node is unavailable to perform the new job, the unavailability being determined based on at least one of:
    database resources;
    an amount of processor usage of the first cluster node exceeding a first threshold value; or
    an amount of memory usage by the first cluster node exceeding a second threshold value.

9. The method of claim 4, wherein the analysis of the availability data entries includes performing a historical analysis to determine that a first cluster node of the plurality of cluster nodes performs the new job faster that a second cluster node of the plurality of cluster notes.

10. The method of claim 4, wherein the metric data comprise data about at least one of:
    processor usage of the first cluster node;
    memory usage of the first cluster node;
    a number of jobs being executed by the first cluster node;
    bandwidth of the first cluster node;
    disk usage of the first cluster node;
    latency of the first cluster node; or
    bytes sent by the first cluster node on a network.

11. The method of claim 4, wherein the computational task of the new job comprises at least one of:
    running a query against a database; or
    loading data into the database.

12. The method of claim 4, wherein the availability data indicates:
    that the first cluster node is unavailable to perform the new job; and
    one or more reasons the first cluster node is unavailable to perform the new job.

13. A system, comprising:
    a memory storing computer-executable instructions; and
    a processor in communication with the memory, the processor configured to execute the computer-executable instructions to:
    repeatedly determining availability data by performing the steps of:
        access metric data representing one or more metric values indicative of one or more quantitative measurements of operation of a first cluster node and a second cluster node while performing at least one job allocated to the first cluster node and at least one job allocated to the second cluster node;
        receive threshold data for the first cluster node and the second cluster node, the threshold data representing one or more threshold values associated with respective metric values associated respectively with the first cluster node and the second cluster node;
        compare the one or more threshold values to the respective ones of the one or more metric values to determine whether the one or more threshold values are greater than or equal to the respective ones of the one or more metric values;
        generate first availability data, for the first cluster node, that indicates a capacity of the first cluster node to perform a new job based on the one or more threshold values associated with the first cluster node being greater than or equal to the respective ones of the one or more metric values;
        generate second availability data, for the second cluster node, that indicates a capacity of the second cluster node to perform the new job based on the one or more threshold values associated with the second cluster node is less than, equal to, or greater than the respective ones of the one or more metric values, wherein if the threshold values associated with the first or second cluster nodes is greater than or equal to the one or more respective metric values for each cluster node the availability data will indicate that cluster node is available to process new jobs and if less than the cluster node is unavailable; and
        saving first and second availability data to a data store indicating historical availability data of previous jobs for the cluster nodes;
    at a second time, responsive to receipt of job data comprising a request to perform the new job comprising a new computational task, determining availability data entries of the first and second cluster nodes generated at and near the second time;
    analyze by the processor of a scheduling system the determined availability data entries of the first and second cluster nodes;
    at a third time, using the job data and the analysis of the determined availability data entries, generate, by the scheduling system, cluster node identification data comprising data identifying one of the first cluster node or the second cluster node to execute the new job, wherein the cluster node identification data indicates which node is best suited to handle the job;
    using the data identifying one of the first cluster node and the second cluster node to provide by the scheduling system the new job to the first cluster node or the second cluster node; and
    execute the new job at the first cluster node or the second cluster node based on the data identifying one of the first cluster node or the second cluster node to be best suited to execute the new job.

14. The system of claim 13, wherein the analysis of the first availability data and the second availability data includes performing a historical analysis to determine that the first cluster node performs the new job faster that the second cluster node.

15. The system of claim 13, wherein the analysis of the first availability data and the second availability data includes performing a historical analysis to determine when to provide the new job to the first cluster node.

16. The system of claim 13, wherein the metric data comprise data about at least one of:
    processor usage of the first cluster node and processor usage of the second cluster node;

memory usage of the first cluster node and memory usage of the second cluster node;

a number of jobs being executed by the first cluster node and the second cluster node;

bandwidth of the first cluster node and bandwidth of the second cluster node;

disk usage of the first cluster node and disk usage of the second cluster node;

latency of the first cluster node and latency of the second cluster node; or bytes sent by the first cluster node on a network and bytes sent by the first cluster node on a network.

17. The system of claim 13, wherein the first availability data indicates:

that the first cluster node is unavailable to perform the new job; and one or more reasons the first cluster node is unavailable to perform the new job.

18. The system of claim 17, wherein the one or more first reasons comprise data representing at least one of:

an amount of processor usage of the first cluster node exceeds a first threshold value;

a number of jobs executing on the first cluster node exceeds a second threshold value; or an amount of memory consumed by the first cluster node exceeds a third threshold value.

19. The system of claim 13, wherein the new job comprises a request to perform at least one of:

running a query against a database; or loading data into the database.

20. The system of claim 13, wherein the data store comprises an availability datastore configured to collect and store the first availability data and the second availability data.

* * * * *